Nov. 12, 1957     L. P. CROSET     2,812,648
COUPLINGS FOR ROTARY MEMBERS
Filed June 25, 1956     4 Sheets-Sheet 1

INVENTOR
LOUIS PAUL CROSET
BY
Young, Emery & Thompson
ATTORNEYS

Nov. 12, 1957  L. P. CROSET  2,812,648
COUPLINGS FOR ROTARY MEMBERS
Filed June 25, 1956  4 Sheets-Sheet 2

INVENTOR
LOUIS PAUL CROSET
BY
ATTORNEYS

Nov. 12, 1957 L. P. CROSET 2,812,648
COUPLINGS FOR ROTARY MEMBERS
Filed June 25, 1956 4 Sheets-Sheet 3

INVENTOR
LOUIS PAUL CROSET
BY
Young, Emery & Thompson
ATTORNEYS

Nov. 12, 1957 L. P. CROSET 2,812,648
COUPLINGS FOR ROTARY MEMBERS
Filed June 25, 1956 4 Sheets-Sheet 4
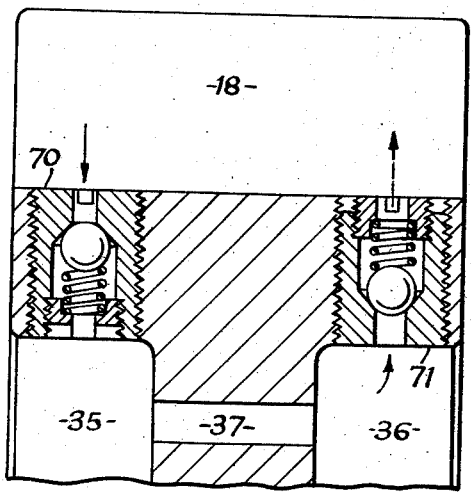
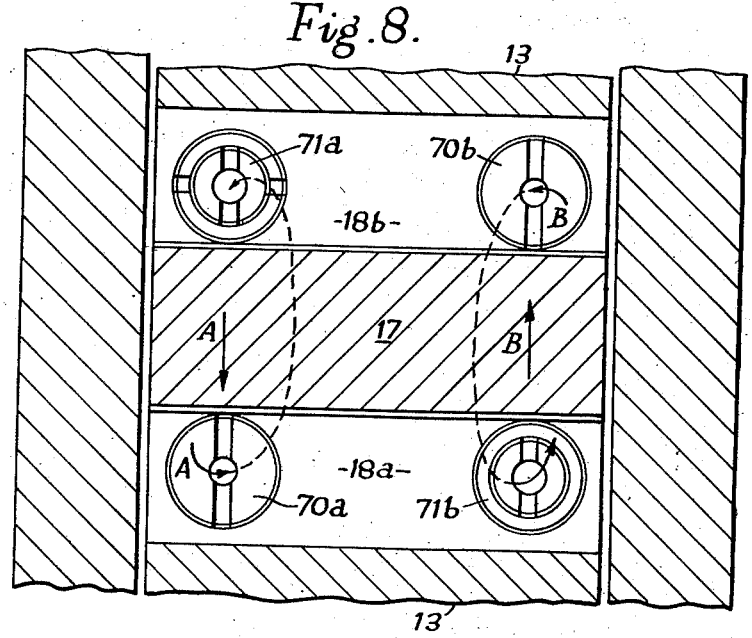
INVENTOR
LOUIS PAUL CROSET

United States Patent Office 2,812,648
Patented Nov. 12, 1957

2,812,648

COUPLINGS FOR ROTARY MEMBERS

Louis P. Croset, Fixby, Huddersfield, England

Application June 25, 1956, Serial No. 593,635

Claims priority, application Great Britain June 28, 1955

5 Claims. (Cl. 64—26)

This invention relates to flexible couplings and its object is to provide a coupling which has virtually no stiffness or an extremely low rate of stiffness to dampen torsional vibrations or other variations of speed or power tranmission in two shafts or other rotary parts. The device is specially suitable for use as a shaft coupling for internal combustion engines.

According to the invention the coupling comprises two coaxial rotary members, the first of which has a plurality of recesses engaged respectively by projections on the second member with a limited freedom of rotary movement of the projections in the recesses about the axis of said members, spaces being provided forming restricted communications from the forward end of each recess to the rearward end of the recess.

The invention will be further described by way of example with reference to the accompanying drawings wherein:

Figure 7 is a view similar to a part of Figure 1 but showing a modification, and Figure 8 is a view similar to Figure 3 but showing the same modification as Figure 7.

Figure 1:
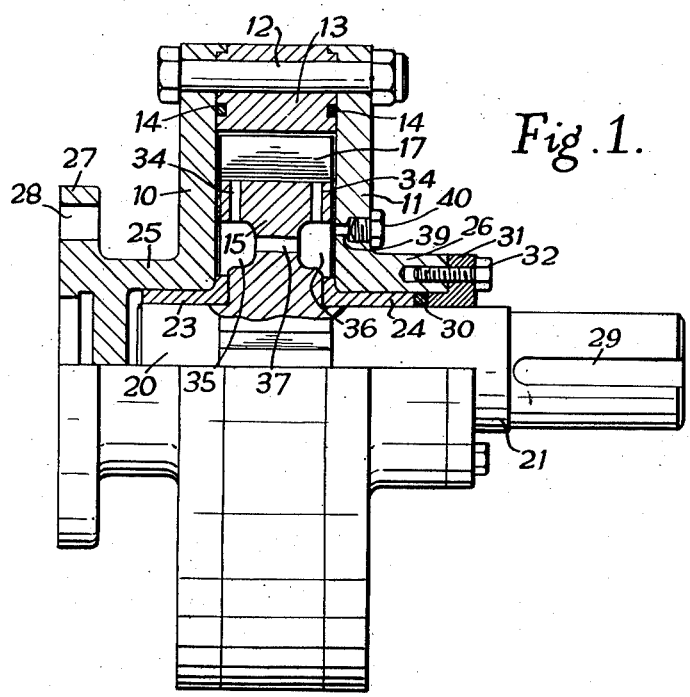
Figure 1 is a view of one form of coupling made in accordance with the invention, the lower part being in elevation and the upper part being in section.
Figure 3:
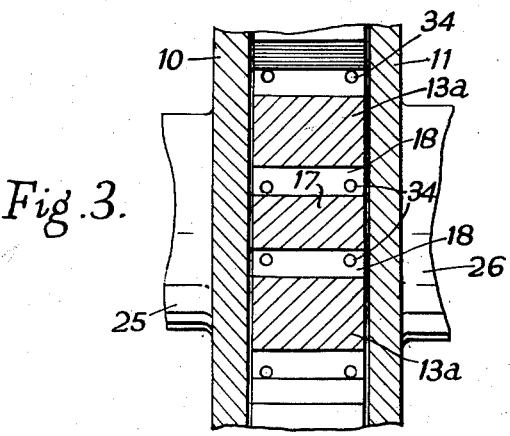
Figure 3 is a part sectional view on the line 3—3 on Figure 2.
Figure 2:
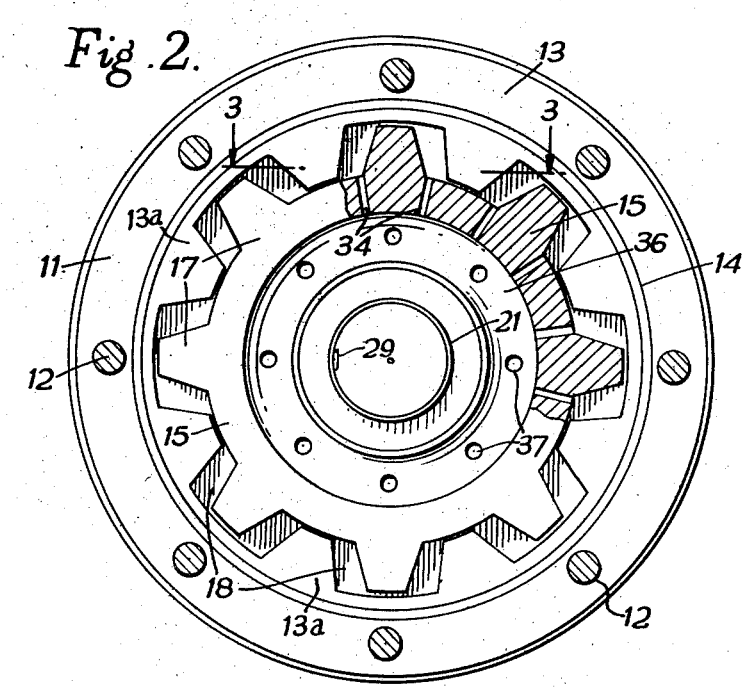
Figure 2 is a view thereof mainly in axial elevation but partly in section.
Figure 4:
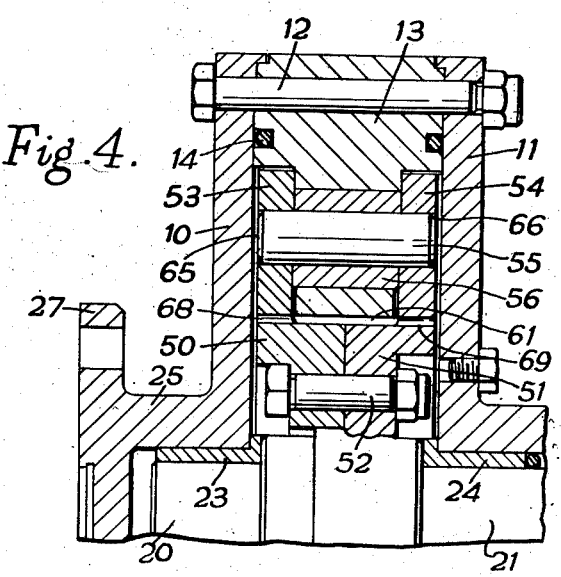
Figure 4 is a view similar to the upper part of Figure 1 but showing another form of coupling made in accordance with the invention.

In the form of the invention shown in Figures 1 to 3 the first rotary member consists of a pair of flanges 10, 11 bolted together by bolts 12 with a ring 13 between them so as to form a drum-like structure. Packing rings 14 are provided between the flanges and ring.

The second rotary member consists of a disc 15 housed within the drum and provided at its outer periphery with radially extending projections 17 shaped somewhat like gear teeth and which engage in recesses 18 in the inner periphery of the ring 13.

The disc 15 has spigots 20, 21 on opposite sides of which bearing bushes 23, 24 are located. The flanges 10, 11 have sleeves 25, 26 that seat on the bushes. The sleeve 25 has a flange 27 that can be bolted by bolts 28 to one of the two shafts to be coupled and the spigot 21 has a keyway 29 for connection to the other shaft, wheel or the like.

A packing ring 30 is provided between the spigot 21 and sleeve 26, this packing ring being compressed by a ring 31 that is bolted by bolts 32 to the sleeve 26.

In the gap between each adjacent pair of teeth 17 are four radially drilled holes 34, two spaced apart close to the root of the tooth at each side of the gap. To increase the viscous drag, the inner ends of these holes are of reduced diameter and in communication with annular recesses 35, 36 forming a fluid reservoir in the opposite sides of the disc 15, these recesses being in communication with each other through ducts 37 parallel with the axis of the shaft. The holes 34 and recesses 35, 36 together form spaces which provide communication from one end of the each recess to the other.

The recesses 18 have a shape in end view similar to the teeth but wider circumferentially, e. g. 10 to 40 percent wider.

The axial width of the disc 15 may be such as to fit within the two side plates with easy sliding fit or with small gaps or instead of gaps there may be small grooves.

The recesses, holes and ducts are filled with a liquid of suitable viscosity such as silicone oil by means of a filler hole 39 normally closed by a plug 40. Two diametrically opposed filler holes 39 and plugs 40 are provided (only one being shown), the one allowing free escape of air from the device or being connected to a vacuum pump, the second hole being used for the introduction of the fluid into the device.

The liquid can be forced through the restricted holes 34 in one direction or the other according to the varying forces, the liquid being transferred from one end of each recess 18 into the annular recesses 35 or 36 and from there into the opposite end of the recess 18.

The device will be hermetically sealed after admitting the liquid and will remain operative for long periods of time without requiring any attention or maintenance, such as addition of liquid.

The disc 15 may if desired be made of non-metallic material.

Figure 5:
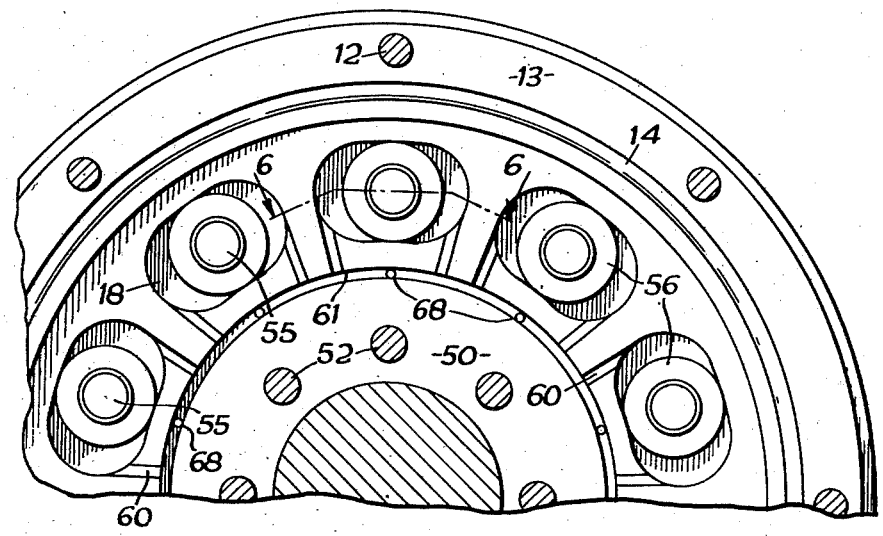
Figure 5 is a part axial view thereof.
Figure 6:
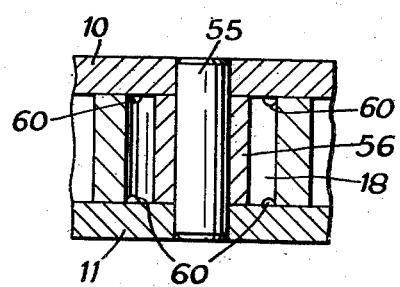
Figure 6 is a sectional view on the line 6—6 on Figure 5.

In the further example of the invention illustrated in Figures 5 to 6, the parts 10, 11, 12, 13, 20, 21, 23, 24, 25, 27 are similar to the parts so numbered in Figures 1 to 3 but the operating recesses 18 are in the form of slots that extend axially through ring 13. The second rotary member in this construction is made in two parts 50, 51 bolted together by bolts 52 and having two flanges 53, 54. The ring 13 extends inwardly between the flanges 53, 54 and the latter carry the projections which are in the form of pins 55 that are disposed axially of the rotary members and carry bushes 56 of non-metallic material which engage in the slots 17. The latter are elongated on the circle or cylindrical figure which contains the axes of the pins 55.

The communicating spaces in this construction are formed by grooves 60 in the first rotary member and an annular gap 61 between the parts 50, 51 and the ring 13.

Small gaps 65, 66 are provided between the member 50, 51 and the flanges 10, 11 these gaps communicating with the gap 61 by means of holes 68, 69.

Figures 7 and 8 show an alternative method of communication between the damping recesses 18 and recesses 35, 36 namely, by the provision of pairs of delivery and non-return valves, instead of the holes 34, to provide a pressure adjustment. The delivery valve 70 is a spring pressed ball valve and may be so dimensioned as to offer greater resistance to the flow of fluid under pressure in the operating side of space 18 than the non-return ball-valve 71 allowing return of fluid from spaces 35, 36 to trailing side of space 18. The operation is as follows: With projections 17 moving in the direction of the arrow A, the pressure build-up will cause the fluid to pass from a recess 18a through delivery valve 70a to recess 35 and from there through return valve 71a to the trailing side of recesses 18b where there is a momentary vacuum. If the movement of the projections 17 is in the direction of arrow B then the flow of liquid is in the opposite direction through delivery valve 70b to recess 36 and the return of fluid through valve 71b. Such a construction may prove useful to provide a pressure adjustment of the viscous drag in devices of large size.

A coupling made in accordance with the invention will produce non-linearity in the dynamic system and thereby prevent the build up of torsional oscillations and provides a construction that is applicable to any drive irrespective of its size, that is, of the speed and torque transmitted, more particularly to shaft systems wherein the prime-mover and/or the driven machine are of the reciprocating type, a universal or torsionally resilient or self-aligning coupling of the spring-steel disc type being preferably interposed between the coupling according to this invention and the driven machine.

I claim:

1. A flexible coupling comprising two coaxial rotary members, the first of which has a plurality of recesses, projections on the second member engaging in said recesses respectively with a limited freedom of rotary movement of the projections in the recesses about the axis of said members, spaces being provided forming restricted communications from the forward end of each recess to the rearward end of the recess, said spaces being in the form of radially drilled holes in the gap between each pair of projections, spaced apart close to the roots of the projections, and communicating with annular recesses in the opposite sides of said second member, these recesses being in communication with each other by ducts through said second member, said first member being in the form of a drum which houses the second member, and liquid in said spaces and recesses.

2. A coupling as claimed in claim 1, wherein the projections extend axially of said members and the recesses are connected by ducts in the second member that are in communication with each other.

3. A coupling as claimed in claim 1, wherein the projections are in the form of pins carried by flanges on the second member, between which flanges is a flange on the first member, said flange having the recesses therein in the form of slots elongated about a cylindrical figure containing the axes of the pins.

4. A coupling as claimed in claim 1, wherein the pins carry non-metallic bushes that fit slidably in said slots.

5. A coupling as claimed in claim 1, wherein the restricted communications are controlled by non-return valves including at least one pair on opposite sides of a projection adapted for permitting flow of fluid in one direction and at least another pair on opposite sides of the same projection permitting flow of the fluid in the opposite direction.

References Cited in the file of this patent

UNITED STATES PATENTS

| | | |
|---|---|---|
| 2,072,561 | Kuhns et al. | Mar. 2, 1937 |
| 2,305,439 | Miller | Dec. 15, 1942 |
| 2,510,225 | Hindmarch | June 6, 1950 |
| 2,730,877 | Suberkrub | Jan. 17, 1956 |